March 11, 1969     F. H. HORN     3,432,753
METHOD OF ANALYZING MATERIALS TO DETERMINE THE
IMPURITY CONTENT THEREOF
Filed Sept. 30, 1966     Sheet _1_ of 2
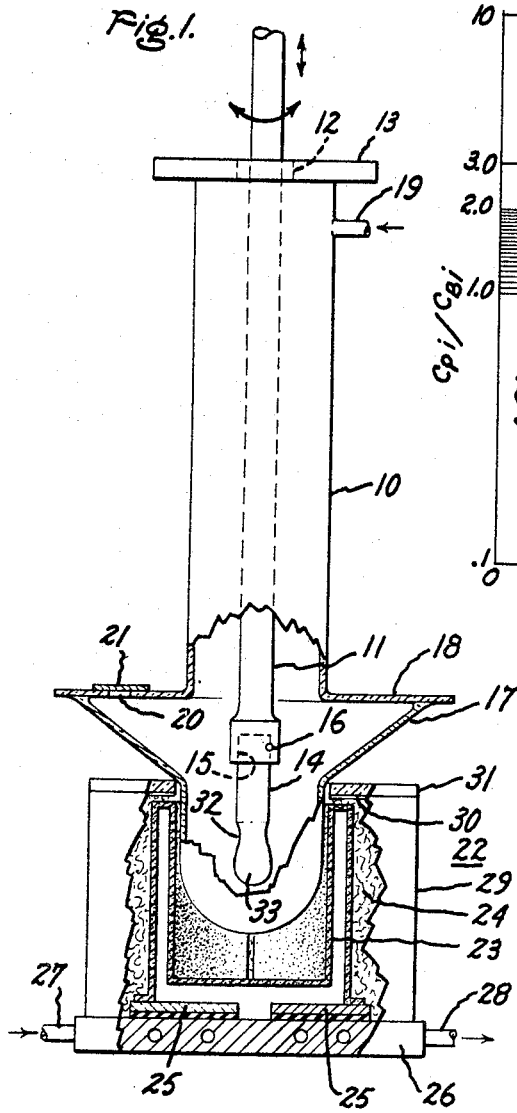
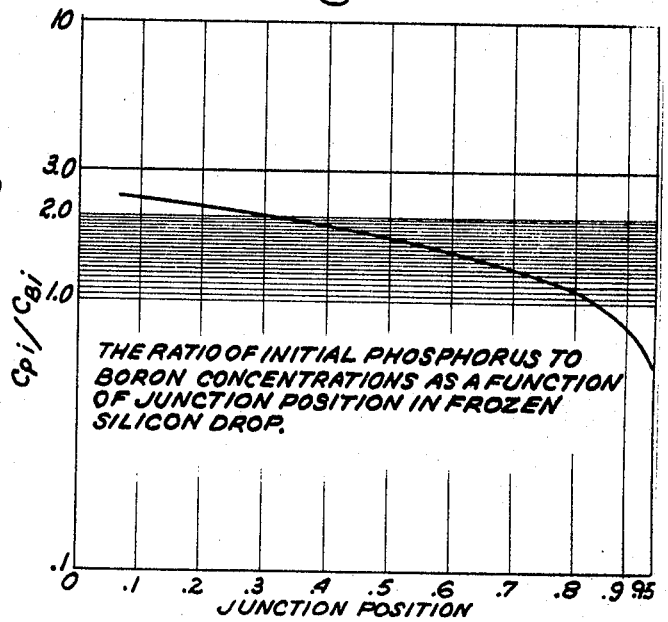
Fig. 2.
THE RATIO OF INITIAL PHOSPHORUS TO BORON CONCENTRATIONS AS A FUNCTION OF JUNCTION POSITION IN FROZEN SILICON DROP.
Inventor:
Fordyce H. Horn,
by Edward D. Murphy
His Attorney.

RESISTIVITY RATIOS AS FUNCTION OF $g$ FOR VARIOUS INITIAL CONCENTRATION RATIOS OF PHOSPHORUS TO BORON $C_{Pi}/C_{Bi}$ FROM 0 TO 1

United States Patent Office 3,432,753
Patented Mar. 11, 1969

3,432,753
METHOD OF ANALYZING MATERIALS TO DETERMINE THE IMPURITY CONTENT THEREOF
Fordyce H. Horn, Schenectady, N.Y., assignor to General Electric Company, a corporation of New York
Filed Sept. 30, 1966, Ser. No. 583,191
U.S. Cl. 324—71
Int. Cl. G01n 27/00, 27/26
13 Claims This invention is directed to a method for the analysis of materials, generally of high purity, to determine the quantity of impurities therein.

Modern technology requires highly accurate knowledge of the impurity content of materials which, although essentially pure, actually contain small amounts of various hard to remove elements. For example, an impurity content as low as 1 part per billion (p.p.b.) of boron in silicon has a substantial effect on its properties and changes the quantity of conductivity-determining impurities which are later added to the silicon in the preparation of transistors and other devices.

Analysis techniques previously known, including various forms of chemical and electrical methods, are extremely complex and time consuming when used for the determination of such small quantities. Furthermore, the cost of equipment required is very high. Finally, even after these difficulties have been accepted and the methods used, the information obtained from these techniques is not complete.

The present invention is directed to a new and improved method of material analysis which provides complete detailed information as to the actual content of various impurities in a given material by means of a process which is brief, simple and extremely precise.

It is accordingly an object of the present invention to provide a novel, simplified method for determining the impurity content of materials.

Another object of this invention is the provision of an impurity content determination method which provides a complete description of the impurity content of the material.

A further object of this invention is the provision of a new and improved method of measuring the quantity of very low concentration impurities in essentially pure materials.

It is also an object of this invention to provide a method of impurity content determination which may be quickly and simply performed and which provides complete and accurate information.

Briefly, in accord with one embodiment of my invention I provide a method of impurity content analysis which includes suspending and melting a sample of the material to be analyzed, unidirectionally freezing the sample to cause impurities in the sample to be distributed in a unique pattern and analyzing the properties of the frozen sample, measured as a function of position along the direction of freezing, to determine the quantity of impurities in the sample. Preferably, the molten sample is suspended vertically below a crystal of the material being analyzed and freezing is conducted downward from the crystal-melt interface.

The novel features believed characteristic of the invention are set forth in the appended claims. The invention itself, together with further objects and advantages thereof may best be understood by reference to the following description taken in connection with the appended drawings in which:

FIGURE 1 is a vertical cross-sectional view of apparatus for melting and freezing a material sample in accord with the method of this invention;

FIGURE 2 illustrates a plot of impurity distribution in silicon as a function of a measured property;

Figure 3:
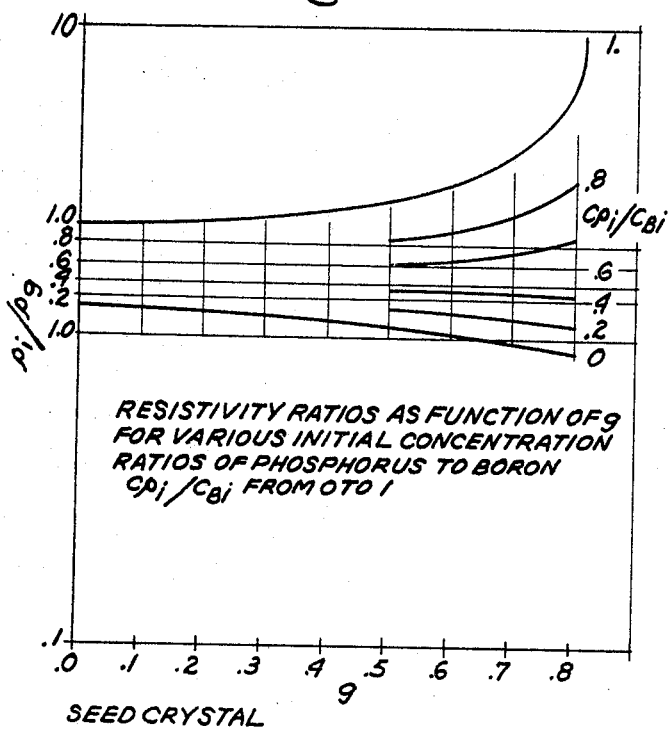
FIGURE 3 is a family of curves of impurity distribution in silicon as a function of a measured property.

In accord with one feature of my invention, a sample of the material of interest is prepared for analysis by suspending, melting and directionally freezing the once molten portion of the sample. Normal freezing accomplishes a redistribution of the impurities in the material in a unique pattern. I have discovered that the sample which results from the above steps may quickly and easily be analyzed to determine the presence of impurities and the quantities thereof. Since the redistribution of impurities in a known, predictable pattern requires heating and freezing only once, the entire process is quick, simple and quite inexpensive.

It is of particular importance, in accord with this invention, that the portion of the sample be melted through and that it be refrozen unidirectionally. Incomplete melting would leave a solid core in which the impurity distribution would be random rather than ordered as in the melt, while uncontrolled non-directional freezing would cause crystallization of the impurities in an unpredictable pattern. A simple, linear progression of the crystal-liquid interface from one end of the drop to the other is preferred.

The rate of growth is also important to this invention. Specifically, it should be controlled to a steady, preferably low value so that the segregation coefficient in the system is as close as possible to the equilibrium value and can fully effect the separation of the impurities.

In accordance with another important feature of the present invention, it is preferred that the sample be suspended from a support so that the molten and refrozen drop is in a dependent position. In this position, the weight of the molten liquid tends to elongate the drop and significantly increases the sensitivity of measurment which can be obtained. In an upright position, the drop tends to compress, while in an angled position, the shape of the drop is not convenient for analysis. Finally, it is desired that as much of the sample be melted as is possible without detaching the drop from the support. This quantity is determined by size of the support, the surface tension and the density of the material in question. A particular advantage of suspending the molten portion is that there is no possibility of contamination by contact with a container or crucible.

Apparatus for performing the step of melting and refreezing of the sample in accord with this invention is illustrated in FIGURE 1 and comprises an inert reaction tube 10 in which a support rod 11 is mounted by means of graphite gland 12 in stopper plate 13. The support rod holds the sample of the material, crystalline rod 14, which may include a seed crystal and a deposit of the material, or may be a sample rod taken directly from stock. The sample is held in a reentrant opening 15 by a set screw 16. External drive means, not shown, may be provided for raising, lowering and rotating the support rod as illustrated by the arrows in FIGURE 1.

The sample is inserted into a quartz crucible 17 and the reaction tube 10 is supported thereon by means of a disk 18. The disk 18 is preferably of flat polished quartz and provides an observation window so that an operator can observe the sample within the crucible. A flow of argon through the reaction tube 10 and crucible 17 is provided through inlet 19 and outlet 20, the outlet being covered by a quartz plug 21 which is provided to maintain the pressure inside the crucible at a slightly higher level than outside.

The crucible is mounted in a heater unit 22 which comprises a graphite heater 23 surrounded by suitable insulation 24. The graphite heater which comprises a reentrant cylinder divided into two halves is mounted on a pair of conductors 25 for electrical connection thereto. These are placed on and insulated from a support block 26 which includes a water inlet 27 and outlet 28 for cooling purposes. The insulation 24 is surrounded by a outer wall 29 and covered by a platinum foil disk 30 and a quartz disk 31 in which the crucible 17 is mounted.

In the practice of my invention, the sample is heated so as to melt the maximum portion thereof which can remain suspended on the end of the sample rod. In practice, this maximum is identifiable by the appearance of a region of reduced diameter 32 approximately at the junction between the molten material and the solid rod. The system is maintained at this point until the drop is completely molten and then the rod is withdrawn from the furnace, or the furnace temperature is reduced in such a manner that the freezing takes place from the solid rod 14 downward to the tip to form a frozen drop 33.

This invention is based in part upon the realization that this procedure causes a complete redistribution of the impurities in the sample into a pattern defined by the segregation coefficient for each impurity. The segregation coefficient is defined as the ratio of the quantity of given impurity per unit mass, or concentration, in solid phase to that per unit mass in the adjoining liquid phase in a growing crystal. If the segregation coefficient for a given solution is 1, the concentration of impurity in the freezing portion equals the concentration of impurity in the liquid and, when the solution is completely crystallized, the impurity is evenly distributed. If the segregation coefficient is greater than 1, the impurity tends to crystallize first while if it is less than 1, the impurity tends to remain in solution. Thus, when a portion of the material is completely melted and then refrozen unidirectionally, impurities in the material which are uniformly distributed in the melt will crystallize according to their respective segregation coefficients and concentrations.

The present invention is further based on the discovery that the resulting frozen drop can be analyzed to determine, from the properties and the change thereof along the direction of freezing, the respective quantities of the various impurities present in the original material. For example, by measuring the difference in a given property between two regions of the frozen drop wherein two potentially present impurities which affect this property will be located, the presence of these impurities can be detected. Thus, from a knowledge of the segregation coefficient of the impurities expected to be present and a knowledge of a property of the material which is affected by these impurities, the impurity content of the material can readily be analyzed.

A significant feature of this invention is that this method is particularly useful in the measurement of impurities which have a small segregation coefficient and are therefore easily removed so that only very small, otherwise unmeasurable quantities are present. That is, impurities with low segregation coefficients are readily removed during the process of producing the material and any remaining quantity is very small. Previous methods of analysis have not been sufficient to determine the concentration of these impurities. By performing an analysis in accord with the present invention, the small segregation coefficient which causes the reduced quantity causes the same impurities to remain in the liquid until nearly all the material is frozen and thus become very heavily concentrated in the tip of the drop. In fact, these impurities are concentrated by a factor equal to the inverse of the segregation coefficient. Therefore, these impurities can readily be detected and measured.

After preparation of the frozen drop, the next step in the process of this invention is to analyze the drop for the properties known to be affected by the expected impurities. This portion of the description of the invention is illustrated by particular reference to silicon since large quantities are used in the manufacture of semiconductive devices and since several difficulties which have previously been encountered in its analysis are overcome. It is to be understood, however, that this method is of general applicability to materials which can conveniently be melted and frozen and is not limited to any particular material. For example, this invention is also well suited for analyzing nickel for the presence of silicon, magnesium and tungsten; gallium arsenide, provided that it is melted while immersed in a liquid medium such as boron oxide which will prevent arsenic evaporation without changing its impurity concentration; boron; magnesium; beryllium; the alkali halides; and various oxide compounds, among others.

In the case of silicon, the analysis is facilitated by the fact that the most important impurities, boron and phosphorous, have slightly different segregation coefficients, both of which are larger than the coefficients for all other impurities except arsenic. The segregation coefficient of arsenic is nearly equal to that of phosphorous; however, arsenic can readily be evaporated from molten silicon because of its high vapor pressure and therefore is usually not present in the material from which the sample is taken. If, however, the material cannot be treated to remove arsenic, the presence of this impurity can be determined by taking two samples and forming frozen drops, one of them having been held in the molten condition for a sufficient length of time to evaporate the arsenic. By testing the drop from which arsenic is removed in the manner described below and repeating these tests with the second sample, the quantity of arsenic present can be determined according to the difference between the two sets of results.

Within the frozen drop, the impurities are distributed according to the laws of normal freezing. Since the segregation coefficient for boron is 0.8, the boron is essentially evenly distributed throughout the drop. Phosphorus has a segregation coefficient of 0.35 and accordingly is concentrated in the lower portion of the drop. The remaining impurities, all of which have segregation coefficients less than or equal to 0.01 are highly concentrated in the lowest tip of the frozen drop.

In normal freezing conditions, the initial concentration of an impurity, $C_i$, before redistribution is given by the following equation $$C_i = C_g/K(1-g)^{K-1}$$

where $K$ is the segregation coefficient of the impurity, $g$ is the fraction of the frozen drop between a point of measurement and the interface and $C_g$ is the concentration of the impurity at that point of measurement. I have found that the following equations may be applied to determine the initial concentrations of phosphorus and boron:

$$1/\rho_0 e\mu = K_B C_{Bi} - K_P C_{Pi}$$

and $C_{Pi} = R C_{Bi}$ where $\rho_0$ = resistivity at $g=0$; that is, at the interface between the unmelted support crystal and the frozen drop;
$e$ = electronic charge
$\mu$ = hole mobility in p-type portion of the frozen drop;
$K_B$ = segregation coefficient of boron
$K_P$ = segregation coefficient of phosphorus
$C_{Bi}$ = initial concentration of boron
$C_{Pi}$ = initial concentration of phosphorus and $R$ = the ratio of the initial concentration of phosphorus to that of boron.

In these equations, $e$, $K_B$ and $K_P$ are known while $C_{Bi}$ and $C_{Pi}$ are the unknowns to be measured. Thus, it is only necessary to measure $\mu$, $\rho_0$, and R to determine the initial concentrations. The mobility of $\mu$ and the interface resistivity, $\rho_0$, are readily measured by known methods; accordingly, it only remains to determine R.

As stated, R represents the ratio of the initial phosphorus concentration to the initial boron concentration. Since boron and phosphorus are opposite in conductivity-type, and since the boron has a substantially higher segregaiton coefficient, the boron will be present to a greater extent in the initial portion of the frozen drop and the conductivity therein is p-type. During freezing of the drop, the phosphorus in solution becomes concentrated more rapidly than the boron; accordingly, at some point the phosphorus concentration, even though originally less than that of boron, becomes equal to and then exceeds that of boron and the conductivity of the frozen drop in this region becomes n-type. The position at which the phosphorus and boron concentrations are equal is thus an electrical junction. The ratio of boron and phosphorus concentrations can be determined by measuring the position of the junction in the frozen drop. This may be done, for example, by placing the crystal in a colloidal suspension of barium titanate in benzene and applying an electric field across the drop which produces a coating of the titanate at the junction. Alternatively, by applying a field to the drop while it is immersed in a solution containing copper, the copper plates on the junction.

Next, the junction position in terms of fraction of the frozen drop crystallized is measured by determining volume ratios. For example, this may be done by means of apparatus including a spring-type balance and a suitable liquid. The length of the spring is noted at several points: (1) when the frozen drop is suspended from the spring in air; (2) when the drop is immersed to a depth corresponding to a position of the junction in a liquid such as water; and (3) when the drop is immersed in the same liquid to the interface between the molten region and the remainder of the seed crystal or sample. The ratio of the spring deflections gives the volume ratio directly, and hence, $g_j$, the fraction of the crystal frozen at the junction is determined.

Since the position of the junction within the frozen drop is determined by the ratio of the initial concentrations of phosphorus to boron, this ratio is obtained from the knowledge of the junction position. FIGURE 2 illustrates a plot of the ratio versus the position of the junction. Thus, the ratio R can be read directly from this plot and used, in conjunction with Equations 2 and 3, to determine the absolute initial concentrations of boron and phosphorus. If the concentration of boron is so large that the junction occurs in the tip of the drop, for example beyond $g=0.85$, and cannot conveniently be measured, the resistivity of the drop may also be used to determine the ratio R. FIGURE 3 is a family of curves for the ratio $\rho_i/\rho_g$, the ratio of the initial resistivity to the resistivity at varying positions along the crystal, corresponding to different ratios of initial concentrations. By comparing the ratio plotted for an unknown sample to this family, R can be determined.

As previously noted, other impurities of lower segregation coefficient are concentrated in the tip of the crystal. Due to this concentration, these impurities may be measured by conventional techniques such as X-ray emission fluorescence or by solid source mass spectrometry. For example, iron, nickel, chromium and copper can be readily identified in silicon and their quantities determined by these techniques.

Figure 4:
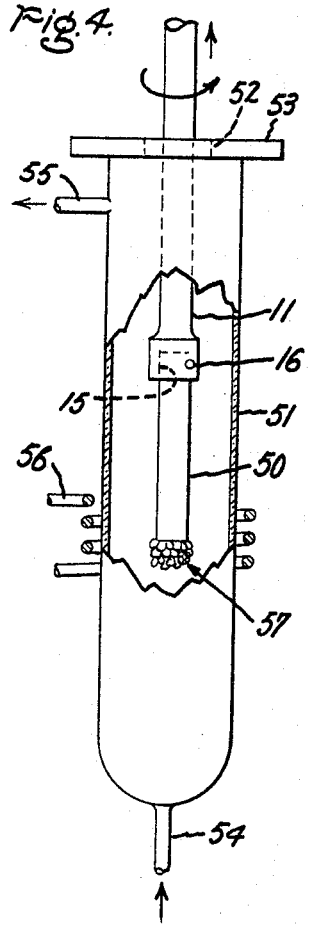
FIGURE 4 illustrates apparatus which may be used in preparing a sample of the material to be analyzed.

For the method described thus far, a sample of the material was provided in a suitable form, preferably a generally longitudinal shape, for the performance of the analysis. Many materials, at the time when analysis is desirable, may be of an inappropriate form, either chemically or physically. For example, the liquid compounds boron triiodide, the precursor of boron and trichlorosilane, the precursor of silicon, must often be handled and analyzed. The apparatus shown in FIGURE 4 is preferred for obtaining the material of interest from its precursor by vapor deposition of the material and included impurities onto a seed crystal. This method is suitable for obtaining a sample from such material since the element is taken from the compound by the same method in manufacturing use and thus any impurities which are not deposited by this method are not present either in the sample or in the material as used.

It is noted that, if the apparatus of FIGURE 4 is used, allowance must be made in the subsequent measurements for any part of the seed crystal which may become mixed with the sample. Accordingly, the weight and impurity content of the seed crystal should be determined in advance with very high accuracy, for example by the method of this invention.

The apparatus for performing the transport and deposit comprises the support rod 11 having a reentrant recess 15 in which a seed crystal 50 is held by means of set screw 16. The rod and seed crystal are disposed in an inert reaction vessel such as quartz tube 51. The rod is fitted into a sliding hermetic seal such as a graphite gland 52 in a quartz cover 53 which is placed on the table.

Inlet and outlet tubulations 54 and 55 are provided for passing a stream of gas including the trichlorosilane through the system and an appropriate heating means such as an RF induction coil 56 is disposed to produce a temperature gradient which causes deposition of silicon. Other appropriate heaters may be used for nonconductive materials. To achieve uniform and generally longitudinal deposition of the silicon, the support rod may be connected to a drive system, not shown, for rotating and pulling the crystal through the temperature gradient, as represented by the arrows. This may be done to avoid concentration of the depositied silicon in a small vertical region on the seed.

In operation, after suitable purging with a material such as argon to eliminate contaminants with the system, a stream of gas containing the trichlorosilane and, for example, hydrogen as a carrier, is passed through the reaction tube. Simultaneously, the RF coil 56 establishes the temperature gradient required for deposition of the silicon on the end of the seed crystal 50. This produces a deposit 57 of the material, usually polycrystalline, extending from the tip of the seed crystal. After a sufficient quantity of the material has deposited, the heating means is shut down and the flow of gas is terminated. In the case of a silicon seed crystal about $\frac{3}{8}''$ in diameter, about one gram of silicon may be deposited. At this point, the seed and deposit comprise sample 14 and are placed in the apparatus of FIGURE 1. The method previously is then preformed.

As previously noted, this invention is generally applicable to materials which can be melted and which form a drop long enough to suitably separate the impurities. To exemplify this, several materials and the methods of analysis used therewith are briefly set forth below.

A sample of nickel is cut from stock and a frozen drop approximately 1.2 cm. long is formed. The drop is sectioned and the sections analyzed by spark spectroscopy. From the emission spectra, the impurity distribution in the drop is obtained and the impurity concentration in the stock is computed.

A sample of beryllium is cut from stock and a frozen drop approximately 2.6 cm. long is formed. The drop in this case is usually polycrystalline. A resistivity profile of the drop is made at ambient temperature and at some appropriate low temperature so that the ratio may be plotted as an indication of impurity concentrations.

A sample of gallium arsenide cut from stock may be melted and frozen while immersed in liquid boron oxide. The two compounds are immiscible and the liquid prevents evaporation of the arsenic. Impurities which cause significant difficulties in gallium arsenide are copper, silicon and phosphorus. The method of this invention is well suited to measuring the quantities of these impurities due to their differing segregation coefficients. Specifically, the coefficient of copper in GaAs is $2 \times 10^{-3}$ and the copper is therefore highly concentrated in the tip of the drop. X-ray emission fluorescence or solid source mass spectrometry can be used to measure the quantity present. The coefficient of silicon in GaAs is 0.14; therefore, a portion of the GaAs near the bottom of the drop is selected for solid source mass spectrometry to measure the quantity of silicon. Finally, the segregation coefficient of phosphorus in GaAs is on the order of 2 to 3. Therefore, the phosphorus is heavily concentrated adjacent the interface between the frozen drop and the unmelted support rod. Optical transmission analysis is suitable if there is a large quantity of phosphorus present; otherwise, mass spectrometry is used. In each case, the concentration as measured for the given portion is converted, using the segregation coefficient for the particular impurity, to give the concentration of the impurity in the material as sampled.

A sample of boron is cut from stock and a frozen drop about 1.9 cm. long is formed. X-ray emission fluorescence is used for impurity analysis, for example for silicon.

The alkali halides, such as KCl, may be analyzed by the method of this invention. Optical transmission analysis is the most useful technique for determining the impurity content.

The oxides of various materials, such as $Al_2O_3$ which forms ruby and sapphire, or $Y_2Al_3O_{12}$ which forms garnet may also be analyzed by this invention. The size of the drop depends on the density and surface tension of the material. In order to allow measurement by the mentioned analysis techniques, the drop size should approach one centimeter and preferably is greater than one centimeter.

To further exemplify the simplicity and usefulness of this invention, several specific examples are set forth below. However, it is not intended to limit this invention to the specifics set forth therein.

*Example I*

A silicon rod approximately 1 cm. in diameter is evaluated for impurity content by lowering the rod into apparatus including a graphite heater as shown in FIGURE 1. The tip of the rod is heated to a temperature of 1407° C. to melt the silicon and the rod is lowered until a molten drop approximately 1.5 cm. long is formed. Upon the appearance of a region of a reduced diameter near the top of the drop, movement of the rod is stopped and heating is continued for several minutes to insure complete melting of the drop. The rod is then removed from the heater at a rate of appproximately 1 mm./min. The existence and location of a junction is determined by placing the drop in a barium titanate solution and applying an electric current through the drop. The barium titanate plates out on the junction. The spring balance method is used to determine that the proportion of the drop between the unmelted rod-frozen drop interface and the junction is $g=0.95$. From FIGURE 2, the ratio of initial concentrations of phosphorus and boron is therefore 0.59. The resistivity at the interface is measured to be 1313 ohm-cm. and the mobility is 450 cm.²/volt. sec. From the equations previously stated, the concentration of boron is 0.36 p.p.b. and the concentration of phosphorus is 0.21 p.p.b. By solid source mass spectrometry, the impurities in the tip are determined to be Cu, Fe, Ca, Mg, Al, Na, and K in the range of parts per million after concentration in the tip. This shows that these are present in parts per billion or less in the original material.

*Example II*

Figure 5:
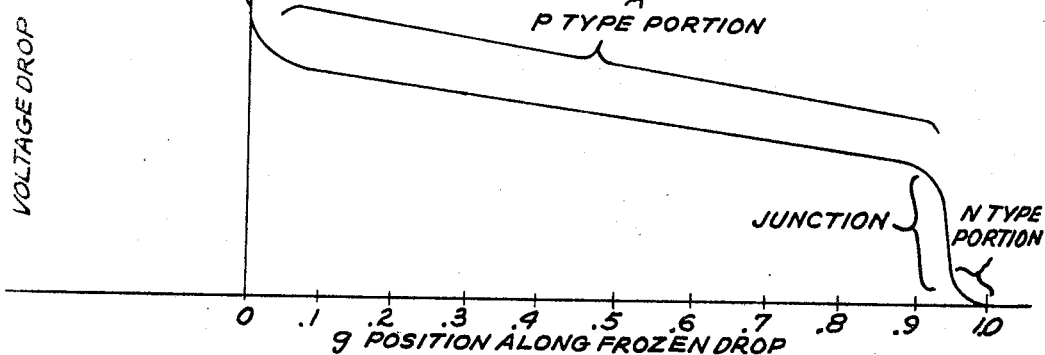
FIGURE 5 is a plot of the variation of one property with position for a sample of material analyzed in accord with this invention.

A silicon rod approximately 1.0 cm. in diameter is evaluated for impurity content by lowering the rod into a graphite heater as shown in FIGURE 1. The tip of the rod is heated to a temperature above 1407° C. to melt the silicon and the rod is lowered until a molten drop approximately 1.5 cm. long is formed. Upon the appearance of a region of a reduced diameter near the top of the drop, movement of the rod is stopped and heating is continued for several minutes to insure complete melting of the drop. The rod is then removed from the heater at a rate of approximately 1 mm./min. The tip of the frozen drop is removed and a bar approximately 2 mm. x 2 mm. in cross-section is cut from the drop. The voltage drop-position profile of the bar is shown in FIGURE 5. From the initial region of the profile, marked A in FIGURE 5, it is determined that the initial resistivity is 1400 ohm-cm. and the resistivity at $g=0.6$ is also 1400 ohm-cm. Therefore, from FIGURE 3, the phosphorus to boron ratio is 0.56, the concentration of boron is 0.33 p.p.b. and the concentration of phosphorus is 0.19 p.p.b. Solid source mass spectrometer analysis of the tip of the drop is used to determine that iron and copper are present in concentrations less than 1 part per million in the tip, therefore the concentrations of these materials in the sample are less than 1 part per billion.

*Example III*

A gallium arsenide rod approximately 1.0 cm. in diameter is evaluated by lowering the rod into apparatus similar to that shown in FIGURE 1 except that the quartz container is lined with graphite and filled with molten boron oxide. The boron oxide forms a clear liquid above 450° C. After the tip of the rod is immersed in the liquid, it is heated to a temperature above 1235° C. to melt the gallium arsenide. The rod is lowered until a molten drop approximately 1.0 cm. long is formed. Upon the appearance of a region of reduced diameter near the top of the drop, movement of the rod is stopped and heating is continued for several minutes to insure complete melting of the drop. The rod is then removed from the heater at a rate of approximately 0.5 mm./min. Sections are cut from the following locations in the drop: adjacent the interface, near the tip at about $g=0.8$ and at the tip. The section from adjacent the interface is analyzed by optical transmission techniques and the phosphorus concentration in this region of the gallium arsenide is determined to be 0.03 atom percent. The section from $g=0.8$ is analyzed by solid source mass spectrometry and the concentration of silicon in this region is determined to be $2 \times 10^{17}$ atoms/cc. The tip of the drop is analyzed by X-ray emission fluorescence and copper is determined to be present. The stated impurity concentrations are then converted into the number of atoms per cc. in the sampled material. It is found that the concentration of silicon is $4 \times 10^{17}$ atoms/cc. and that of phosphorus is 0.15 atom percent in the material as sampled.

*Example IV*

A beryllium rod approximately 1.0 cm. in diameter is evaluated by lowering the rod into apparatus similar to that shown in FIGURE 1. The tip of the rod is heated to a temperature above 1278° C. to melt the beryllium and the rod is lowered until a molten drop approximately 2.5 cm. long is formed. Upon the appearance of a region of reduced diameter near the top of the drop, movement of the rod is stopped and heating is continued for several minutes to insure complete melting of the drop. The rod is then removed from the heater at a rate of approximately 3 mm./min. The longitudinal profile of resistivity is determined at room temperature and at liquid hydrogen temperature using an A.C. induction method. The ratio of resistivity at room temperature to that at liquid hydrogen temperature is plotted as a function of position along the frozen drop. Beryllium suitable for use, for example for purification by zone refining, is selected on the basis that some portion of the drop show a large resistivity ratio. A large ratio indicates the absence of non-segregating impurities since these tend to reduce the ratio.

It can be seen from the foregoing description that the present invention is directed to a method of analysis which incorporates the advantages of simplicity and accuracy. The invention is based on the characteristics of impurity-containing materials and upon the realization that much of the information desired can be obtained in a simple, straightforward fashion. Other processes, which generally involve some variation of zone refining, require a large number of steps, each involving a number of factors such as rate and zone length which must be controlled with extreme care. This invention requires only a single melting process and does not require precision in the parameters of the process. The present invention, in fact, relies on precisely the characteristics of normal freezing which have been previously considered to obstruct its utility as an analysis method, such as the directional dependence of impurity concentration and the concentration of impurities of small segregation coefficients to achieve the mentioned advantages of simplicity and accuracy.

What I claim as new and desire to secure by Letters Patent of the United States is:

1. A method of analyzing a high purity material to determine the impurity content thereof comprising the steps of preparing a crystalline sample of the material to be analyzed; supporting said sample while leaving an end thereof unsupported; melting a portion of said sample at said unsupported end, said melted portion being suspended from said sample; freezing said melted portion unidirectionally and at a predetermined rate to form a frozen drop including the impurities present in said molten region, said impurities being distributed in said frozen drop in a pattern determined by the segregation coefficients of said impurities; and measuring at least one property of at least one selected portion of said frozen drop which is affected by said impurities to determine the impurity content of said material.

2. The method of analysis claimed in claim 1 wherein said sample is prepared by vapor deposition of said material on a seed crystal.

3. The method of analysis claimed in claim 2 and including the further step of moving said seed crystal during said deposition to achieve a longitudinal deposit.

4. The method of analysis claimed in claim 1 wherein said sample is supported in a vertical position and said unsupported end is at the bottom of said sample.

5. The method of analysis claimed in claim 4 wherein said melted portion is the maximum quantity of said material which can depend from said sample without separating.

6. The method of analysis claimed in claim 5 wherein said freezing is performed by cooling said portion progressively in a downward direction.

7. The method of analysis in claim 1 wherein said freezing is conducted progressively from the interface between said melted portion and said sample.

8. The method of analysis claimed in claim 1 wherein said freezing is conducted at a constant rate to distribute said impurities in a pattern proportional to said segregation coefficients.

9. The method of analysis claimed in claim 1 wherein said material comprises a semiconductor and wherein said measuring step comprises measuring the voltage drop through said frozen drop as a function of position.

10. A method of analysis claimed in claim 1 wherein said material comprises silicon and wherein said measuring step comprises measuring the electrical properties of at least a portion of said frozen drop to determine the concentrations of boron and phosphorus in said sample.

11. A method of analysis claimed in claim 10 wherein said measuring step comprises determining the location of a junction between regions of opposing conductivity type material in said frozen drop.

12. A method of analysis claimed in claim 1 wherein said material comprises a metal and wherein said measuring step comprises analyzing said selected portion by means of a mass spectrometer.

13. A method of analysis claimed in claim 1 wherein said material comprises gallium arsenide and where said melted portion is immersed in liquid boron oxide to prevent decomposition of said gallium arsenide.

References Cited

UNITED STATES PATENTS 3,271,115   9/1966   Keller _____ 23—301

RUDOLPH V. ROLINEC, *Primary Examiner.*

E. E. KUBASIEWICZ, *Assistant Examiner.*

U.S. Cl. X.R.

250—41.9; 23—301; 148—173; 117—106